(12) United States Patent
Harano

(10) Patent No.: US 7,443,349 B2
(45) Date of Patent: Oct. 28, 2008

(54) RADIO COMMUNICATION DEVICE

(75) Inventor: Nobuya Harano, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/198,352

(22) Filed: Aug. 8, 2005

(65) Prior Publication Data

US 2006/0028380 A1   Feb. 9, 2006

(30) Foreign Application Priority Data

Aug. 9, 2004 (JP) ............... 2004-232338

(51) Int. Cl.
*H01Q 1/24* (2006.01)
(52) U.S. Cl. .................. 343/702; 343/846
(58) Field of Classification Search ............ 343/702, 343/846, 829
See application file for complete search history.

(56) References Cited

U.S. PATENT DOCUMENTS

| | | | |
|---|---|---|---|
| 5,337,061 A * | 8/1994 | Pye et al. | 343/702 |
| 5,561,436 A * | 10/1996 | Phillips | 343/702 |
| 5,561,437 A * | 10/1996 | Phillips et al. | 343/702 |
| 6,246,374 B1 | 6/2001 | Perrotta et al. | |
| 6,342,859 B1 | 1/2002 | Kurz et al. | |
| 6,995,719 B2 * | 2/2006 | Ide | 343/702 |
| 2004/0027298 A1 | 2/2004 | Iguchi et al. | |

FOREIGN PATENT DOCUMENTS

| | | |
|---|---|---|
| EP | 1 359 639 A1 | 11/2003 |
| JP | H09-326632 A | 12/1997 |
| JP | H10-032424 A | 2/1998 |
| JP | H11-340731 A | 12/1999 |
| JP | 2000-216628 A | 8/2000 |
| JP | 2002-158520 A | 5/2002 |
| JP | 2004-56703 A | 2/2004 |
| JP | 2005-167912 A | 6/2005 |
| WO | WO 02/05432 A2 | 1/2002 |

* cited by examiner

*Primary Examiner*—Tho G Phan
(74) *Attorney, Agent, or Firm*—Sughrue Mion, PLLC (57) ABSTRACT

A radio communication device including: a case; a circuit board mounted inside the case; an antenna apparatus that is arranged inside the case and is fed electricity from the circuit board; and one or a plurality of antenna improving elements that are each arranged inside the case and each have a line section with one end grounded at one point to a ground of the circuit board and with another end open, in which the antenna improving element is arranged near a central portion of the case along a longitudinal direction thereof, and the antenna apparatus is arranged near an end of the case along the longitudinal direction thereof.

13 Claims, 12 Drawing Sheets

An inverted-F antenna arranged on a conducting plane, and to a passive element arranged parallel to the inverted-F antenna.

RADIO COMMUNICATION DEVICE

BACKGROUND OF THE INVENTION

1. Field of the Invention

The present invention relates to a radio communication device having a case, and more particularly to a radio communication device that allows an improved antenna gain even with a reduced antenna mounting space inside a case.

2. Description of the Related Art

In recent years, due to increased functionality of cellular telephones and other radio communication devices, high-density mounting inside the cases is advancing. In particular, in a case of a radio communication device with a case that can be folded, high-density mounting has become remarkable.

Japanese patent laid-open publication JP 09-326632 A (laid open on Dec. 16, 1997) discloses a technique relating to an inverted-F antenna arranged on a conducting plane, and to a passive element arranged parallel to the inverted-F antenna.

Japanese patent laid-open publications JP 10-032424 A (laid open on Feb. 3, 1998), JP 11-340731 A (laid open on Dec. 10, 1999), and JP 2000-216628 A (laid open on Aug. 4, 2000) disclose techniques related to a radio communication device antenna and a passive antenna arranged near this antenna.

However, in antenna apparatuses that are mounted inside their cases, the higher-density mounting in the radio communication device makes it difficult to secure enough mounting space. When the mounting space is reduced, there is a basic tendency that the antenna efficiency and the frequency bandwidth of the antenna device will suffer. Therefore, as the mounting becomes denser and the antenna apparatus mounting space becomes smaller, this causes deterioration of various antenna characteristics.

SUMMARY OF THE INVENTION

A first object of the present invention to provide a radio communication device that improves antenna gain, even in a case where antenna mounting space inside a case is reduced. A second object of the invention to provide a radio communication device that achieves a more compact sizes and higher functionality.

According to the present invention, there is provided a radio communication device including: a case; a circuit board mounted inside the case; an antenna apparatus that is arranged inside the case and is fed electricity from the circuit board; and one or a plurality of antenna improving elements that are each arranged inside the case and each have a line section with one end grounded at one point to a ground of the circuit board and with another end open, wherein: the antenna improving element is arranged near a central portion of the case along a longitudinal direction thereof; and the antenna apparatus is arranged near an end of the case along the longitudinal direction thereof.

In a radio communication device according to the present invention, the case includes a first case and a second case, the first case and the second case are connected to each other in a foldable fashion via a connecting member, the circuit board is mounted inside the first case, the one or a plurality of antenna improving elements are arranged inside the first case near the connecting member, and the antenna apparatus is arranged inside the first case in a position more distant from the connecting member than the antenna improving element.

In a radio communication device according to the present invention, the case includes a first case and a second case, the first case and the second case are connected to each other in a foldable fashion via a connecting member, the circuit board is mounted inside the second case, the one or plurality of antenna improving elements are arranged inside the second case, near the connecting member, and the antenna apparatus is arranged on an outside of the second case in a position more distant from the connecting member than the antenna improving element.

In a radio communication device according to the present invention, the line section is made of a conducting plate.

In a radio communication device according to the present invention, the line section is made of one of a conducting plate and a conducting wire formed in a meander shape.

In a radio communication device according to the present invention, the line section is made of a conducting wire formed in a coil shape.

In a radio communication device according to the present invention, the line section is formed as an integral molding with dielectrics.

According to another aspect of the present invention, there is provided a radio communication device including: a first case; a second case connected to the first case in a foldable fashion via connecting means; a circuit board mounted inside the first case; an antenna apparatus that is arranged inside the first case and is fed electricity from the circuit board; one or a plurality of antenna improving means that are each arranged inside the first case and each have one end grounded at one point to a ground of the circuit board and with another end is open, wherein: the antenna improving means is arranged near the connecting means, and the antenna apparatus is arranged in a position more distant from the connecting means than the antenna improving means.

In accordance with the present invention, the antenna improving element decreases a radio frequency current flowing to the case in which the antenna apparatus is not arranged, thereby reducing the deterioration of antenna characteristics due to a reverse-phase electrical current. Further, in accordance with the present invention, the line section is formed to be the conducting plate, thereby enabling the device to handle low frequencies. Furthermore, in accordance with the present invention, the line section is formed in the meander shape, whereby the device can work when requiring electrically longer element length. Furthermore, in accordance with the present invention, even when involving various shapes, installation can be performed steadily. Furthermore, the dielectric constant of the dielectrics causes an effect of a wavelength compaction ratio, whereby creating an effect of expanding the frequency bandwidth.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE PREFERRED EMBODIMENTS

First Embodiment

Figure 1:
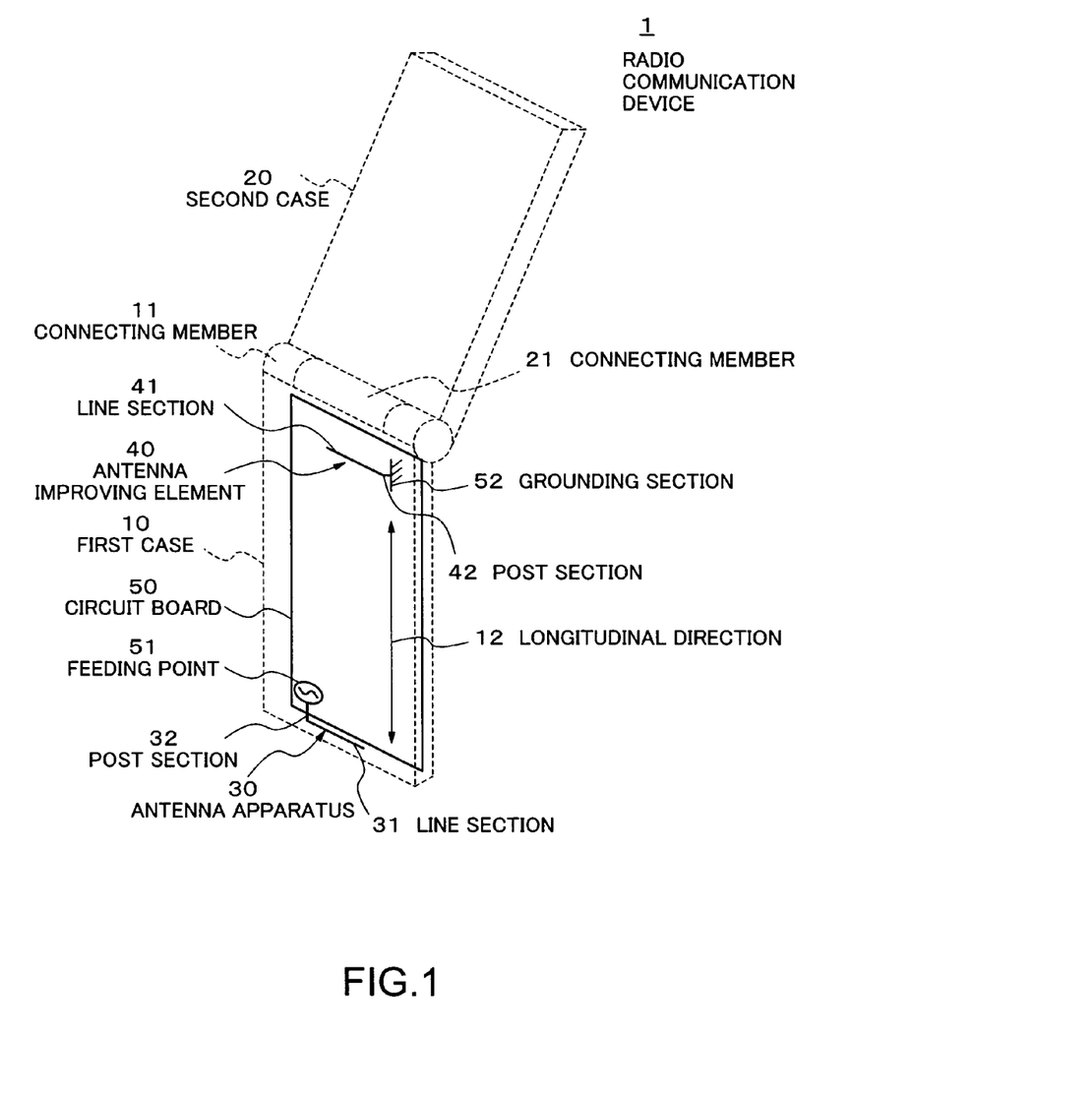
FIG. 1 is a perspective diagram schematically showing a construction of a radio communication device in accordance with a first embodiment of the present invention.

The diagrams are used to explain a first embodiment of the present invention. FIG. 1 is a perspective diagram schematically showing a construction of a radio communication device in accordance with the first embodiment of the present invention.

Referring to FIG. 1, a radio communication device 1 is a radio communication device including a cellular telephone or the like having a case that can be folded. The radio communication device 1 is provided with a first case 10, a second case 20, an antenna apparatus 30, an antenna improving element 40, and a circuit board 50.

The first case 10 is a case on which at least the antenna apparatus 30, the antenna improving element 40, and the circuit board 50 are mounted, and has a connecting member 11. The first case 10, for example, can be a case serving as an operating side having a microphone and a keyboard. The connecting member 11 is located near a central portion along a longitudinal direction 12 of the case which includes the first case 10 and the second case 20. The connecting member 11 is connected rotatably to a connecting member 21. The connecting member 11 is connected rotatably to the connecting member 21, and enables folding of the first case 10 and the second case 20. The connecting member 11, for example, may be a hinge-type connecting member or a revolver-type connecting member.

The second case 20 has the connecting member 21 and, for example, can be the case serving as a display side having a speaker and a display screen. The connecting member 21 is rotatably connected to the connecting member 11, and enables folding of the first case 10 and the second case 20.

Note that, in addition to the connecting members 11 and 21, the first case 10 and the second case 20 may also have another connecting member enabling folding of another case. As the first case 10 and the second case 20, it is also possible to use a case whose entirety is made of a conductor. Furthermore, as the first case 10 and the second case 20, it is also possible to use a case with a conductive material applied onto the surface of its mould, or a case with a conductive material deposited onto the surface of its mould.

The antenna apparatus 30 transmits or receives electrical waves. The antenna apparatus 30 has a line section 31 and a post section 32. The antenna apparatus 30 is provided with one or more post sections 32, which are connected electrically to the circuit board 50. The antenna apparatus 30 is fed electricity from the circuit board 50 via the post section(s) 32. The line section 31 is furnished inside the first case 10, and is bent or the like to fit the shape of the inner surface of the first case 10, thereby achieving a compact size. Here, the line section 31 is bent into an L-shape fitting the shape of the inner wall of the first case 10. As shown in FIG. 1, a distance from the second case 20 to the antenna apparatus 30 is larger than a distance from the second case 20 to the antenna improving element 40. As shown in FIG. 1, the antenna apparatus 30 may also be furnished to an end of the first case 10.

The antenna improving element 40 is a passive element for controlling an electrical flow on the circuit board 50. The antenna improving element 40 has a line section 41, and a post section 42. The antenna improving element 40 is disposed, inside the first case 10, near the connecting member 11. The antenna improving element 40 is grounded to a ground of the circuit board 50, and is passive. The antenna improving element 40 is provided with one or more post sections 42 grounded to a grounding section 52 of the circuit board 50. One end of the line section 41 is connected to the post section 42 and grounded at one point to the ground of the circuit board 50, and another end is an open-end. In order to arrange the line section 41 inside the first case 10, it is bent and the like to fit the shape of the inner wall of the first case 10, thereby achieving a compact in size. Here, the line section 41 is bent such that its metal wire is in an L shape, thus fitting the case. The antenna improving element 40 is a passive element for controlling an electrical flow on the circuit board 50. Therefore, the antenna improving element 40 and the antenna apparatus 30 do not need to be arranged in parallel. The antenna improving element 40 must be placed near the connecting member 11 that is close to the case (here, the second case 20) to which an electrical flow on the circuit board 50 is not allowed. Note that the antenna improving element 40 resonates at the same frequency as the antenna apparatus 30. The antenna improving element 40 is not intended to resonate at a different frequency from the antenna apparatus 30.

The circuit board 50 is a wiring board mounted with predetermined electronic parts thereon, and is furnished inside the first case 10. The circuit board 50 has a feeding point 51 for feeding electricity to the antenna apparatus 30. The feeding point 51 is connected electrically to the antenna apparatus 30. The circuit board 50 is connected electrically to the antenna improving element 40 at the grounding section 52, and does not feed electricity to the antenna improving element 40. The radio frequency current generated by the antenna apparatus 30 flows on the circuit board 50.

Figure 2:
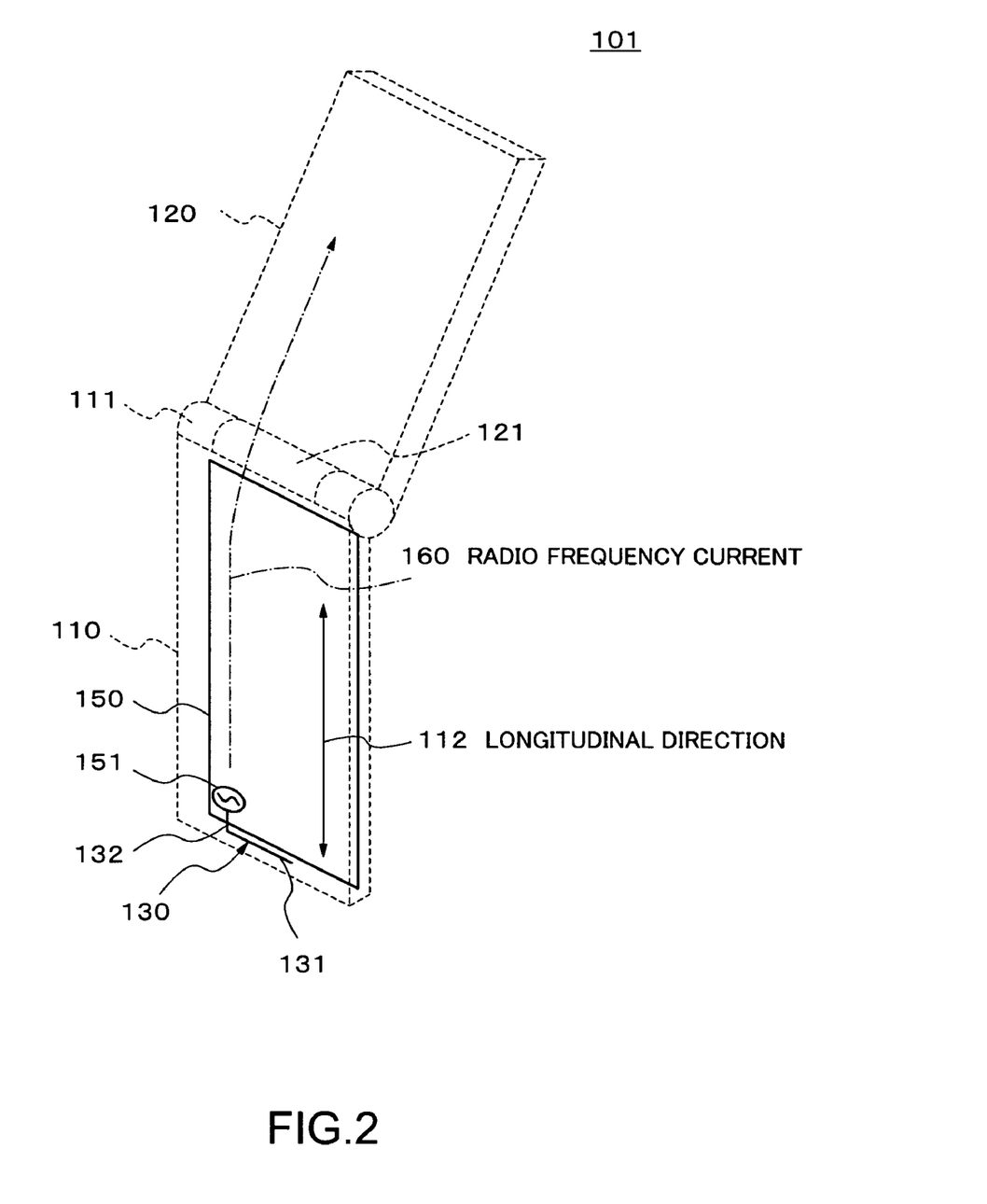
FIG. 2 is a schematic diagram for explaining a flow of a radio frequency current generated by an antenna apparatus of a radio communication device in accordance with a comparative example.
Figure 3:
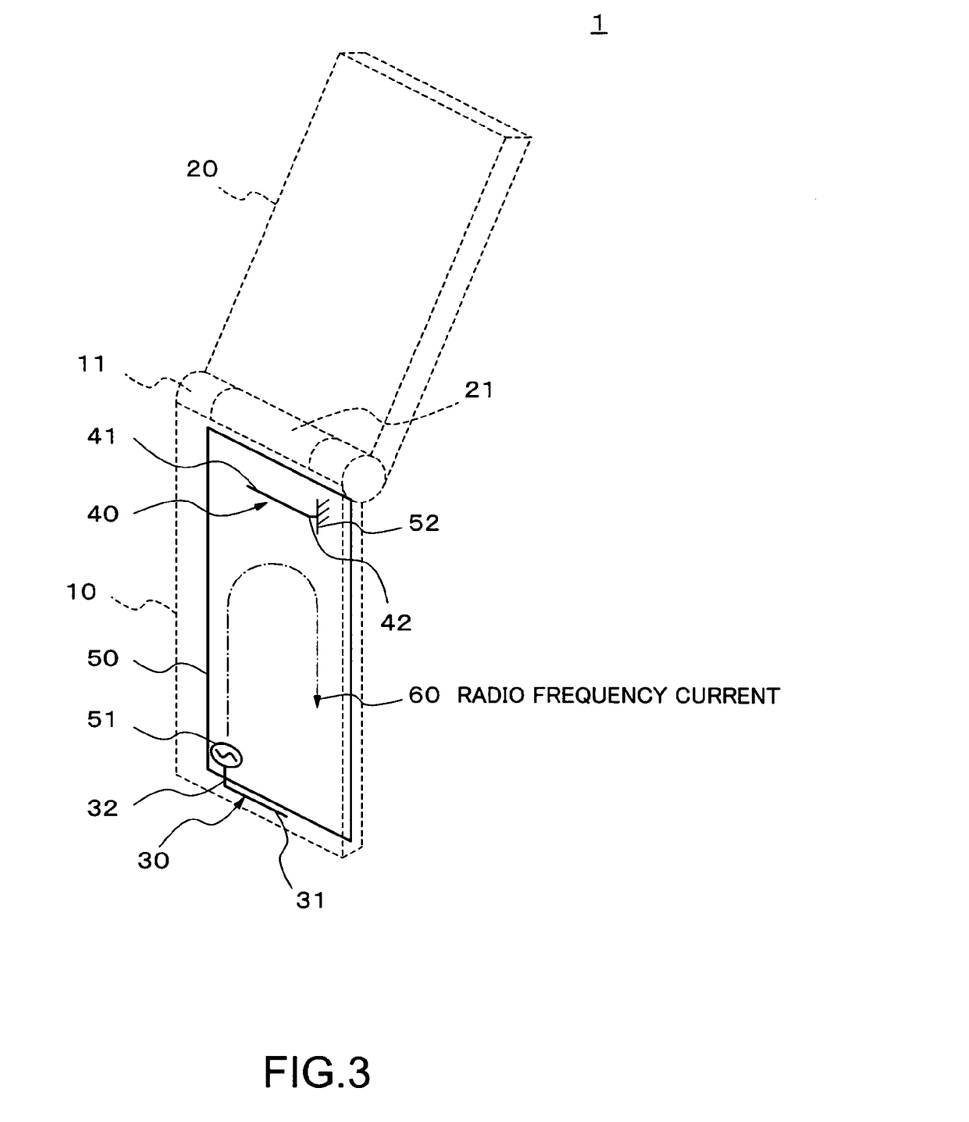
FIG. 3 is a schematic diagram for explaining a flow of a radio frequency current generated by an antenna apparatus of the radio communication device in accordance with the first embodiment of the present invention.

Next, the diagrams are used to explain a flow of the radio frequency current generated by the antenna apparatus of the radio communication device in accordance with the first embodiment, with contrasts made to a comparative example. FIG. 2 is a schematic diagram for explaining a flow of a radio frequency current generated by an antenna apparatus of a radio communication device in accordance with the comparative example. FIG. 3 is a schematic diagram for explaining the flow of radio frequency current generated by an antenna apparatus of the radio communication device in accordance with the first embodiment of the present invention. Here, a radio communication device 101 according to the comparative example is constructed without the antenna improving element 40 in the radio communication device 1 of the first embodiment.

Referring to FIG. 2, in the radio communication device 101, a radio frequency current 160 generated by an antenna apparatus 130 flows along a first case 110. Furthermore, the radio frequency current 160 also flows through a connecting member 111 and a connecting member 121 to a second case 120. When the electric length of the radio frequency current 160 rises to λ/2 or greater, the phase of the electromagnetic waves directly radiated into space from the antenna apparatus 130, and the radio frequency current 160 flowing to the case (including the first case 110 and the second case 120), becomes a reverse phase, which causes the antenna gain of the radio communication device 101 to decrease. Here, the electric length, with a wavelength λ of the radio frequency current 160 serving as a standard of reference, is used to express what fraction the wavelength of the electrical current flowing through the conductor is of the wavelength λ. The conductor refers to the conductor portion of the first case 110, a conductor portion of the second case 120, and the circuit board 50.

On the other hand, in the radio communication device 1 in accordance with the first embodiment, the antenna improving element 40 serves as a reflector replacing the ground. This decreases the radio frequency current 60 flowing from the first case 10 to the second case 20 via the connecting members 11 and 21 (see FIG. 3).

Figure 4:
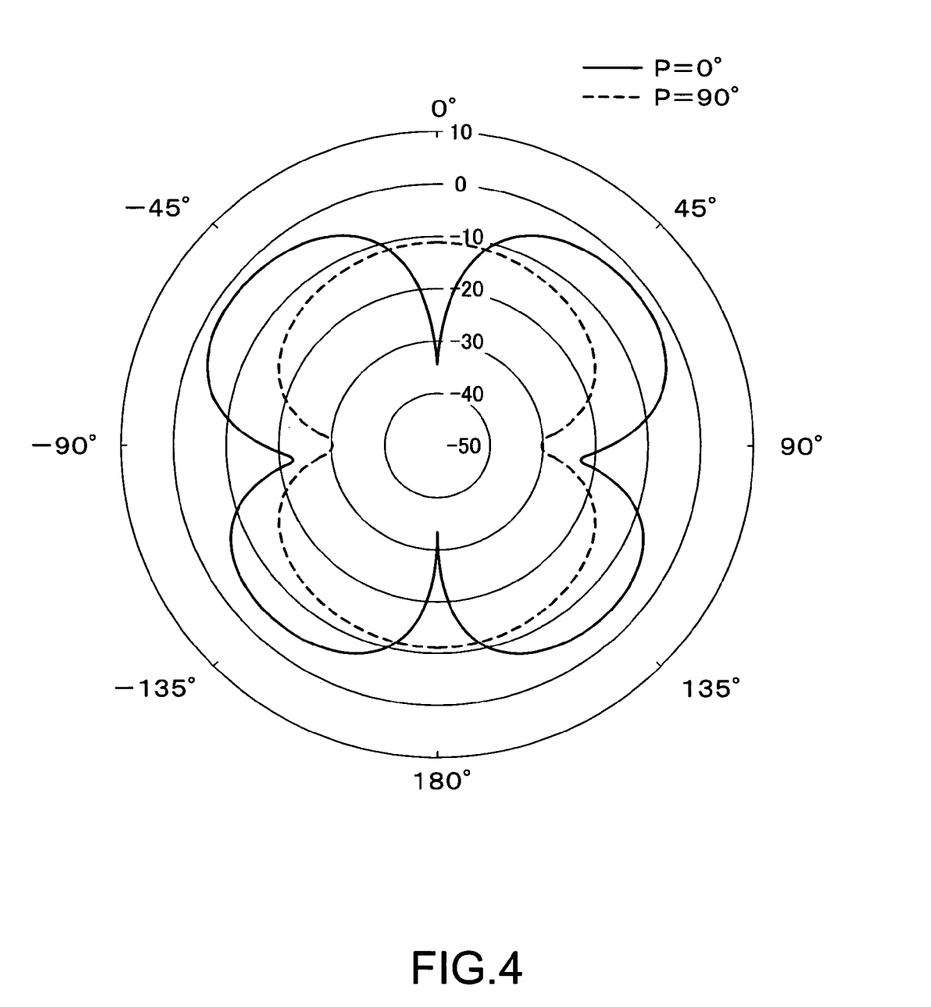
FIG. 4 is a schematic diagram for explaining radiation characteristics of the radio communication device in accordance with the comparative example.
Figure 5:
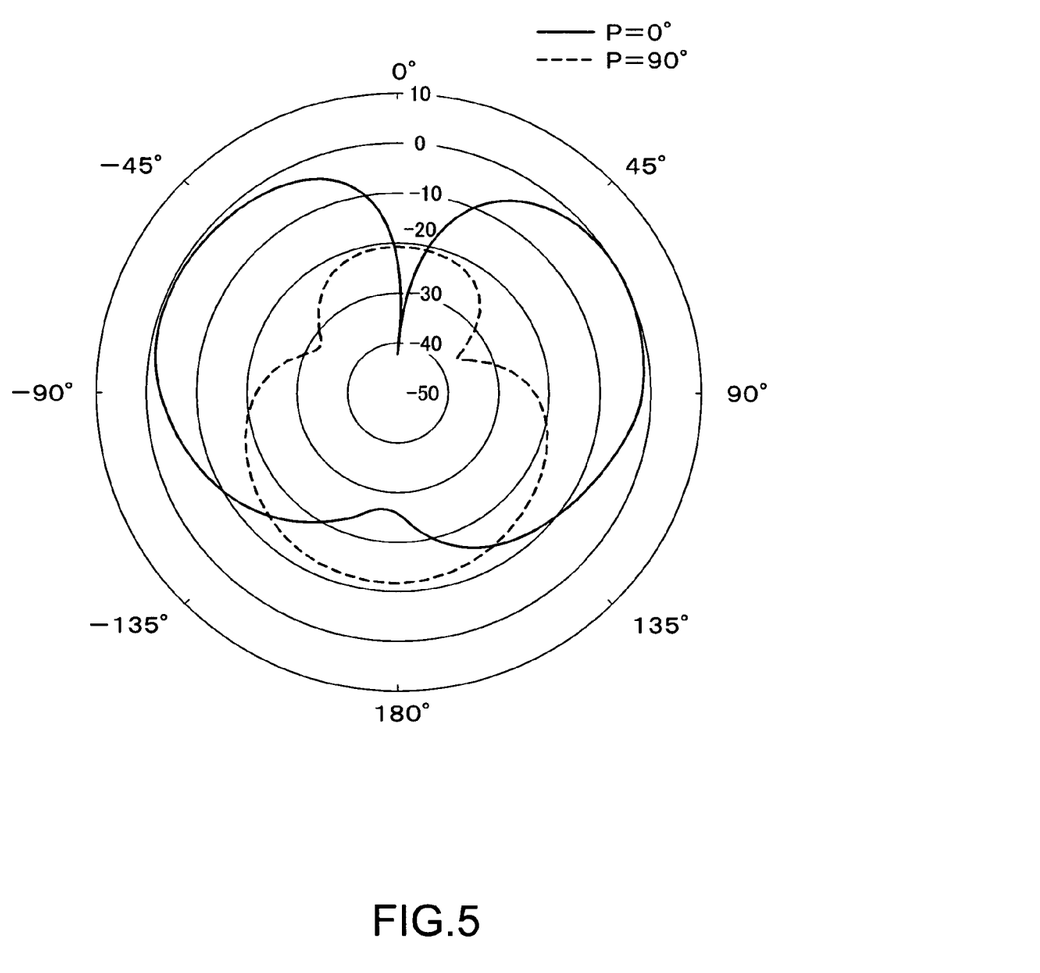
FIG. 5 is a schematic diagram for explaining radiation characteristics of the radio communication device in accordance with the first embodiment of the present invention.

Next, the diagrams are used to explain radiation characteristics of the radio communication device of the first embodiment, in contrast to the comparative example. FIG. 4 is a schematic diagram for explaining radiation characteristics of the radio communication device in accordance with the comparative example. FIG. 4 is a schematic diagram for explaining the radiation characteristics of the radio communication device according to the comparative example. This schematic diagram depicts, radiation characteristics on a plane perpendicular to the first case 110, which includes an axis of the first case 110 along a longitudinal direction 112. FIG. 5 is a schematic diagram for explaining the radiation characteristics in the radio communication device in accordance with the first embodiment of the present invention. This schematic diagram depicts the radiation characteristics on a plane perpendicular to the first case 10, which includes an axis of the first case 10 along a longitudinal direction 12. In FIGS. 4 and 5, the radiation characteristics indicated by the solid lines, and the radiation characteristics indicated by the broken lines, are radiation characteristics defined by polarized waves that intersect perpendicularly with each other.

In the radio communication device 101, there are cases where a null point is generated in the radiation characteristics, due to a reverse-phase electrical current flowing to the second case 120. Referring to FIG. 4, in a horizontal direction (+90° direction) a null point is created due to the reverse-phase electrical current. The horizontal direction refers to the direction along a surface perpendicularly crossing the axis of the first case 10 and 110 along the longitudinal directions 12 and 112, respectively.

On the other hand, in the radio communication device 1, the occurrence of the null point is suppressed by the addition of the antenna improving element 40. Referring to FIG. 5, it is clear that the null point in the horizontal direction has been corrected. That is, the radiation characteristics caused by the two perpendicularly intersecting polarized waves have been improved, including those along the horizontal direction. Note that when the electrical length in the first case 10 is less than λ/2 of the frequency being used by the radio communication device 1, the effect of the antenna improving element 40 is increased. Furthermore, when the total electrical length in the first case 10 and the second case 20 is less than λ/2, the effect of the antenna improving element 40 can be exhibited more easily. Here, λ denotes the frequency being used. The used frequency is the transmitting frequency and the receiving frequency being used by the antenna apparatus 30.

The antenna improving element 40 reduces the radio frequency current flowing to the second case 20, producing the effect of reducing the deterioration of the radiation characteristics due to the reverse-phase electrical currents.

Second Embodiment

Figure 6:
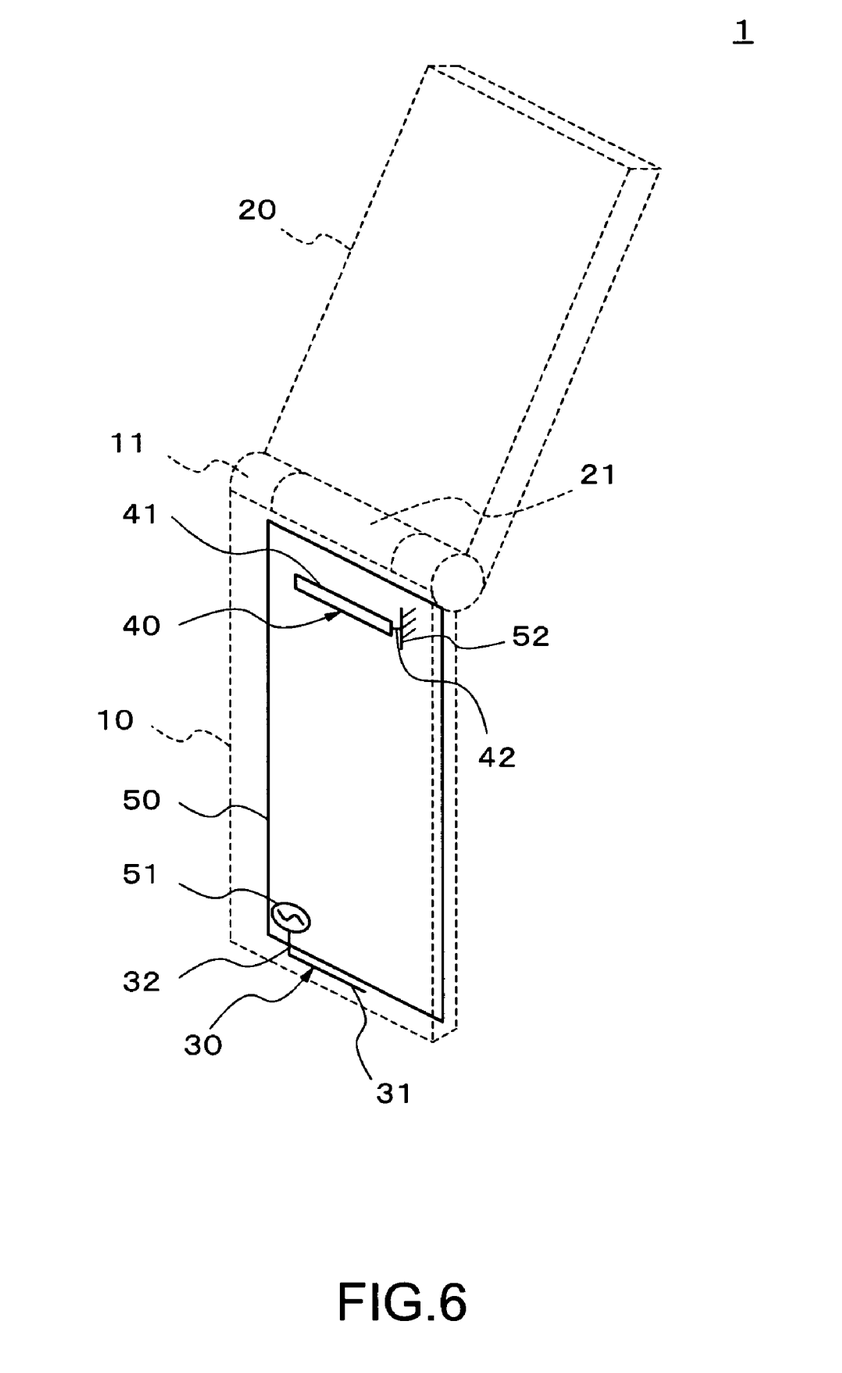
FIG. 6 is a perspective diagram schematically showing a construction of a radio communication device in accordance with a second embodiment of the present invention.

Next, the diagrams are used to explain a second embodiment of the present invention. FIG. 6 is a perspective diagram schematically showing a construction of a radio communication device in accordance with a second embodiment of the present invention. In the second embodiment, the line section 41 of the antenna improving element 40 is formed of a metal plate. This is formed in an L-shape, including the line section 41 and the post section 42. This metal plate may be a conducting plate including carbon fiber reinforced plastic (CFRP). Other components are similar to those of the first embodiment. The line section 41 is formed using the conducting plate, thereby increasing the frequency bandwidth.

Third Embodiment

Figure 7:
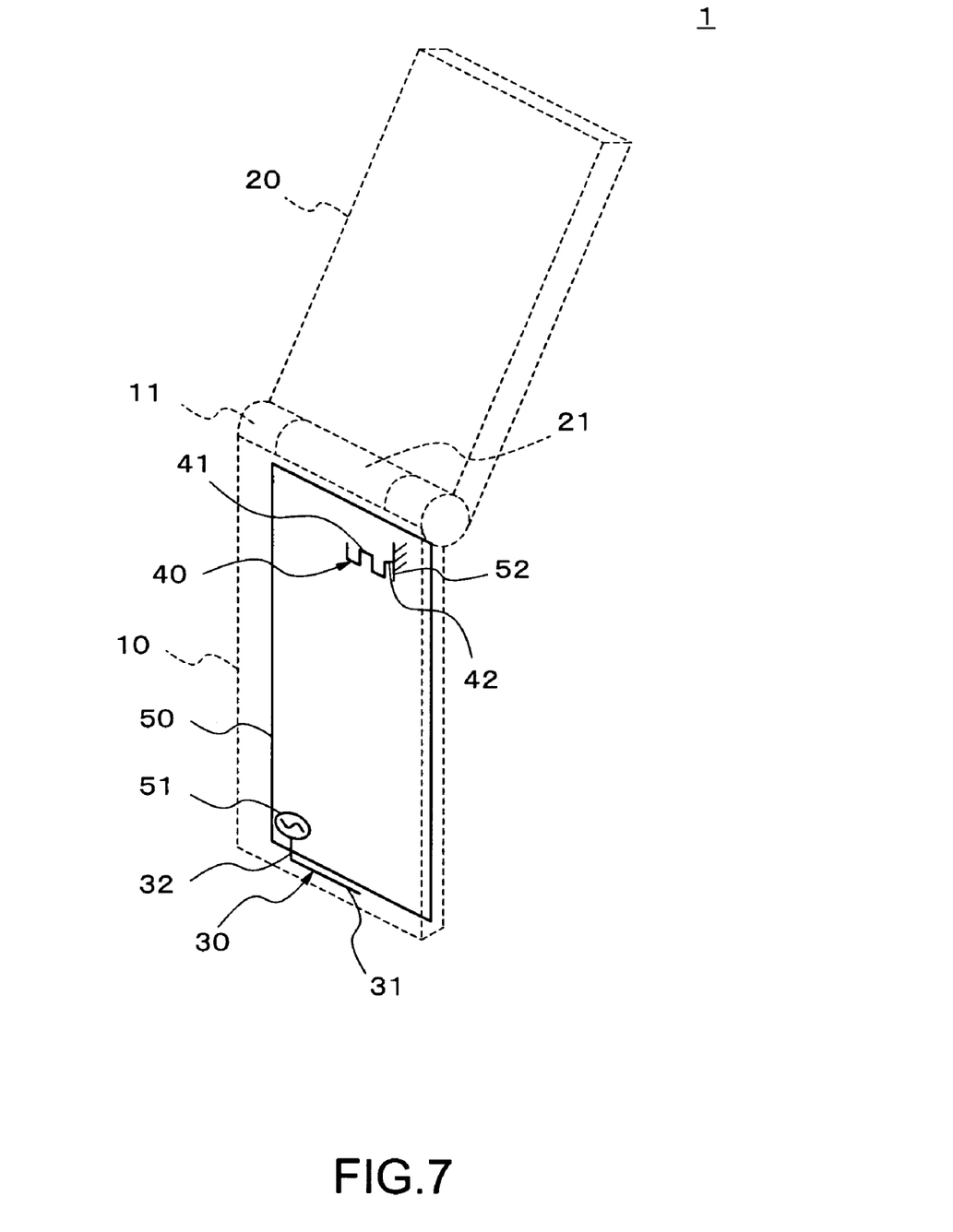
FIG. 7 is a perspective diagram schematically showing a construction of a radio communication device in accordance with a third embodiment of the present invention.

Next, the diagrams are used to explain a third embodiment of the present invention. FIG. 7 is a perspective diagram schematically showing a construction of a radio communication device in accordance with the third embodiment of the present invention. According to the third embodiment, the line section 41 of the antenna improving element 40 is formed to be a metal wire (or metal plate) having an L shape twisted into a meander shape. This metal wire (or metal plate) may be a conducting wire (or conducting plate) including carbon fiber reinforced plastic (CFRP). Other components are similar to those of the first embodiment. Since the line section 41 is formed in the meander shape, the line section 41 can be made compact. Furthermore, in exactly the same mounting space, the entire length of the line section 41 can be longer when using the meander shape than when formed in a straight line. Therefore, the device can handle lower frequencies.

Fourth Embodiment

Figure 8:
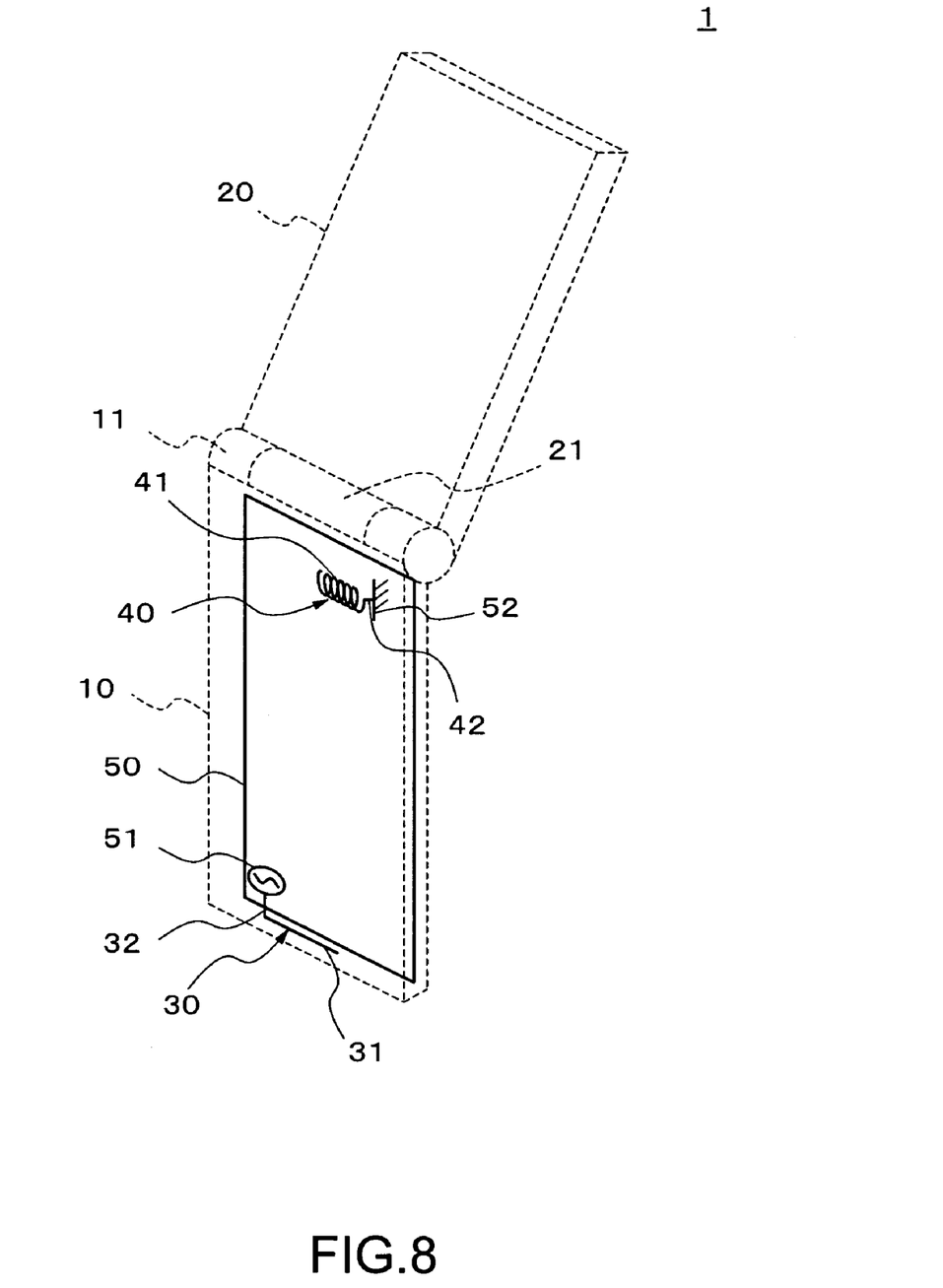
FIG. 8 is a perspective diagram schematically showing a construction of a radio communication device in accordance with a fourth embodiment of the present invention.

Next, the diagrams are used to explain a fourth embodiment of the present invention. FIG. 8 is a perspective diagram schematically showing a construction of the radio communication device in accordance with the fourth embodiment of the present invention. According to the fourth embodiment, the line section 41 of the antenna improving element 40 is formed to be a metal wire having an L shape formed as a coil. This metal wire may be a conducting wire including carbon fiber reinforced plastic (CFRP). Other components are similar to those of the first embodiment. Since the line section 41 is formed in the coil shape, the line section 41 can be made compact. Furthermore, in exactly the same mounting space, the entire length of the line section 41 can be longer when using the coil shape than when formed in a straight line. Therefore, the device can handle lower frequencies.

Fifth Embodiment

Figure 9:
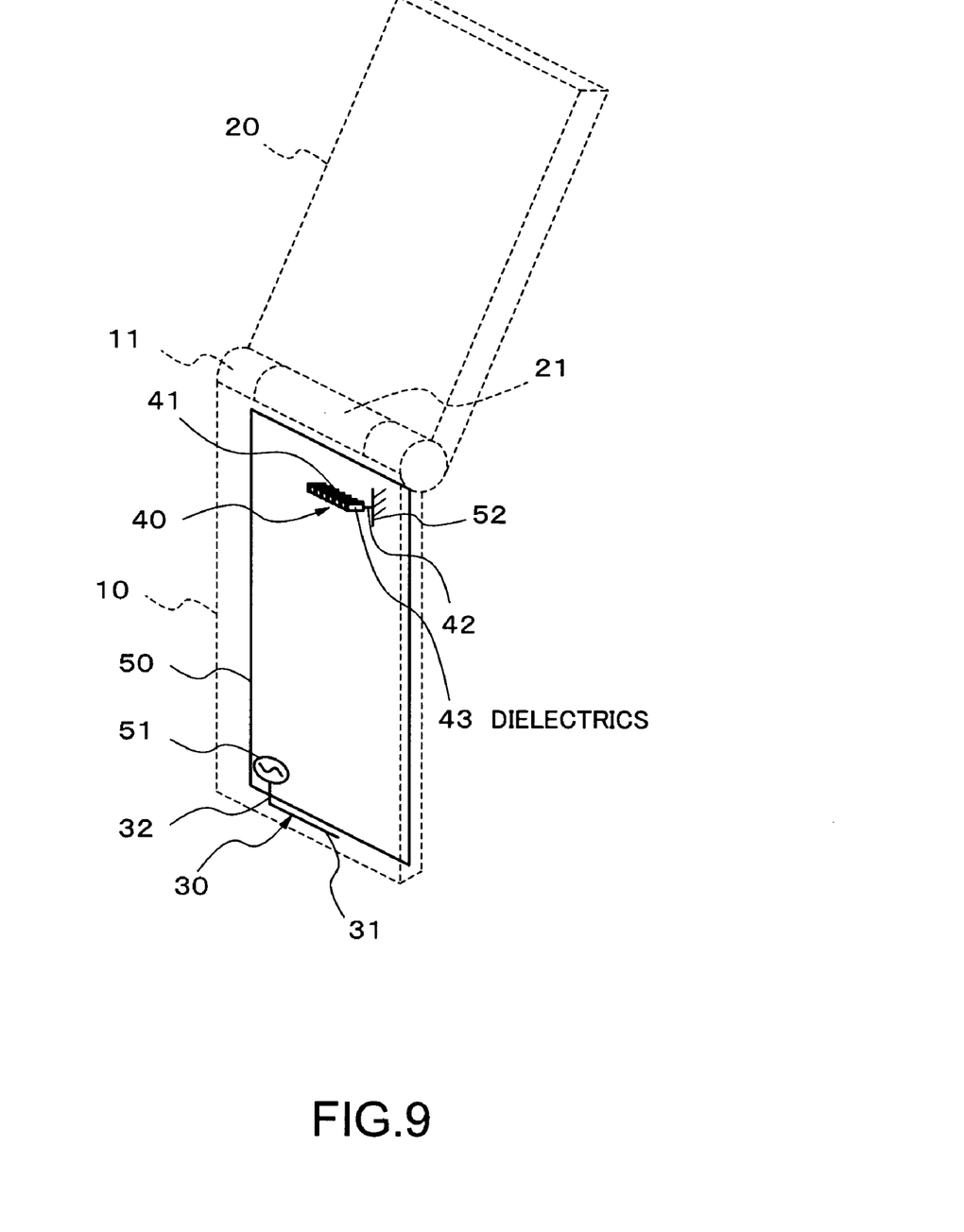
FIG. 9 is a perspective diagram schematically showing a construction of a radio communication device in accordance with a fifth embodiment of the present invention.

Next, the diagrams are used to explain a fifth embodiment of the present invention. FIG. 9 is a perspective diagram schematically showing a construction of a radio communication device in accordance with the fifth embodiment of the present invention. According to the fifth embodiment, a dielectrics 43 made of resin or the like is used to form the line section 41 as an integral molding. For this integral molding formation, the line section 41 can be formed as a nesting into the resin, or the line section 41 can be adhered to the resin with double-sided tape or the like, or the line section 41 can be fitted into the groove formed in the resin, or the like. Other components are similar to those of the first embodiment. A wavelength compaction ratio due to dielectrics has an effect of enabling the line section 41 to be made compact. Furthermore, this wavelength compaction ratio has an effect of lowering a specific resonance frequency of the antenna improving element 40. If high dielectrics having a high dielectric constant are used for the dielectrics 43, the wavelength compaction ratio is increased, producing an effect of lowering the specific resonance frequency.

Sixth Embodiment

Figure 10:
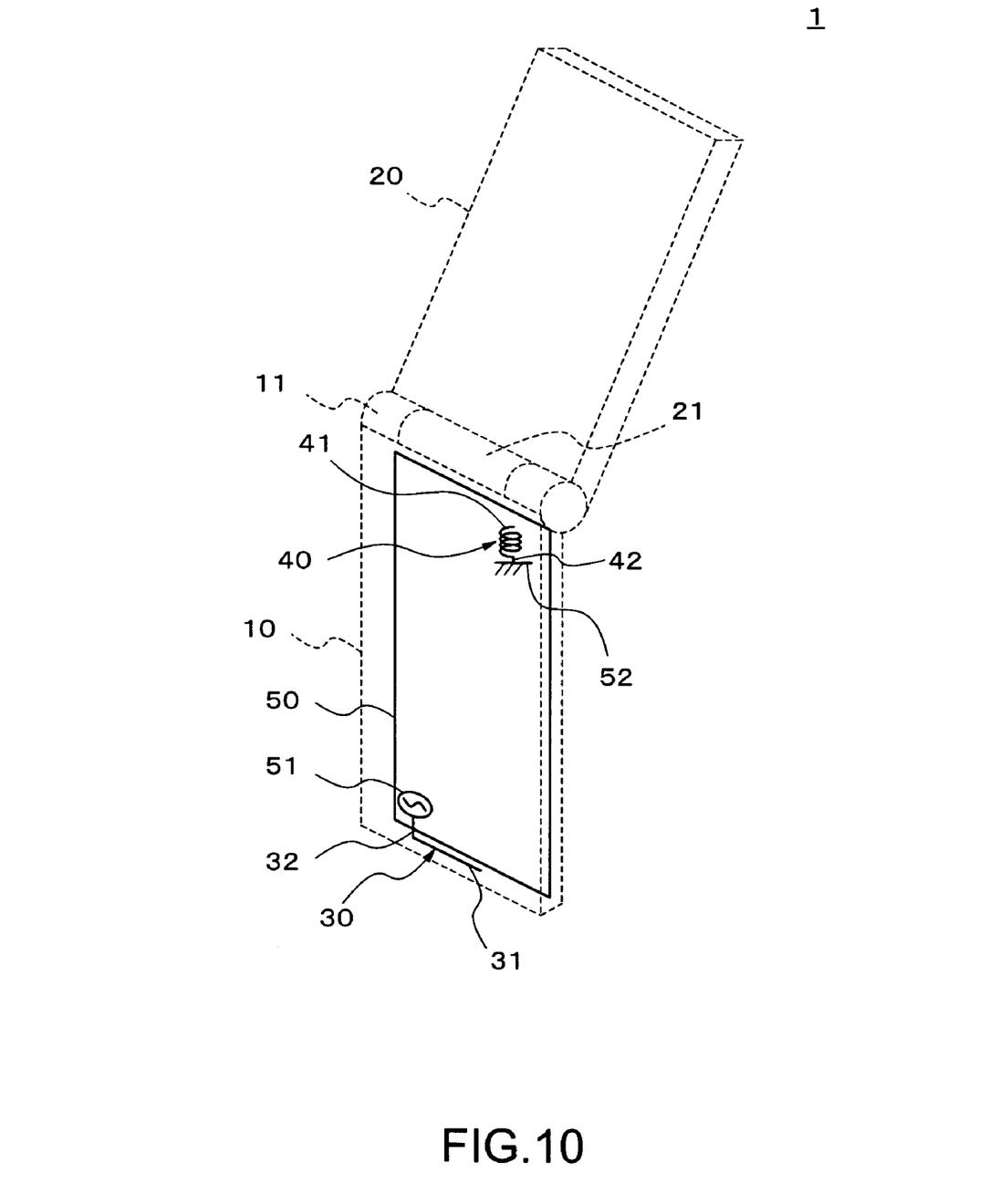
FIG. 10 is a perspective diagram schematically showing a construction of a radio communication device in accordance with a sixth embodiment of the present invention.

Next, the diagrams are used to explain a sixth embodiment of the present invention. FIG. 10 is a perspective diagram schematically showing a construction of a radio communication device in accordance with the sixth embodiment. According to the sixth embodiment, the line section 41 formed in the coil shape is arranged perpendicularly to a board surface of the circuit board 50. Other components are similar to those of the first embodiment. The line section 41 is formed in the coil shape, allowing the line section 41 to be made compact. Furthermore, in exactly the same mounting space, the entire length of the line section 41 can be made longer when using the coil shape than when formed in a straight line. Therefore, the device can handle lower frequencies.

Seventh Embodiment

Figure 11:
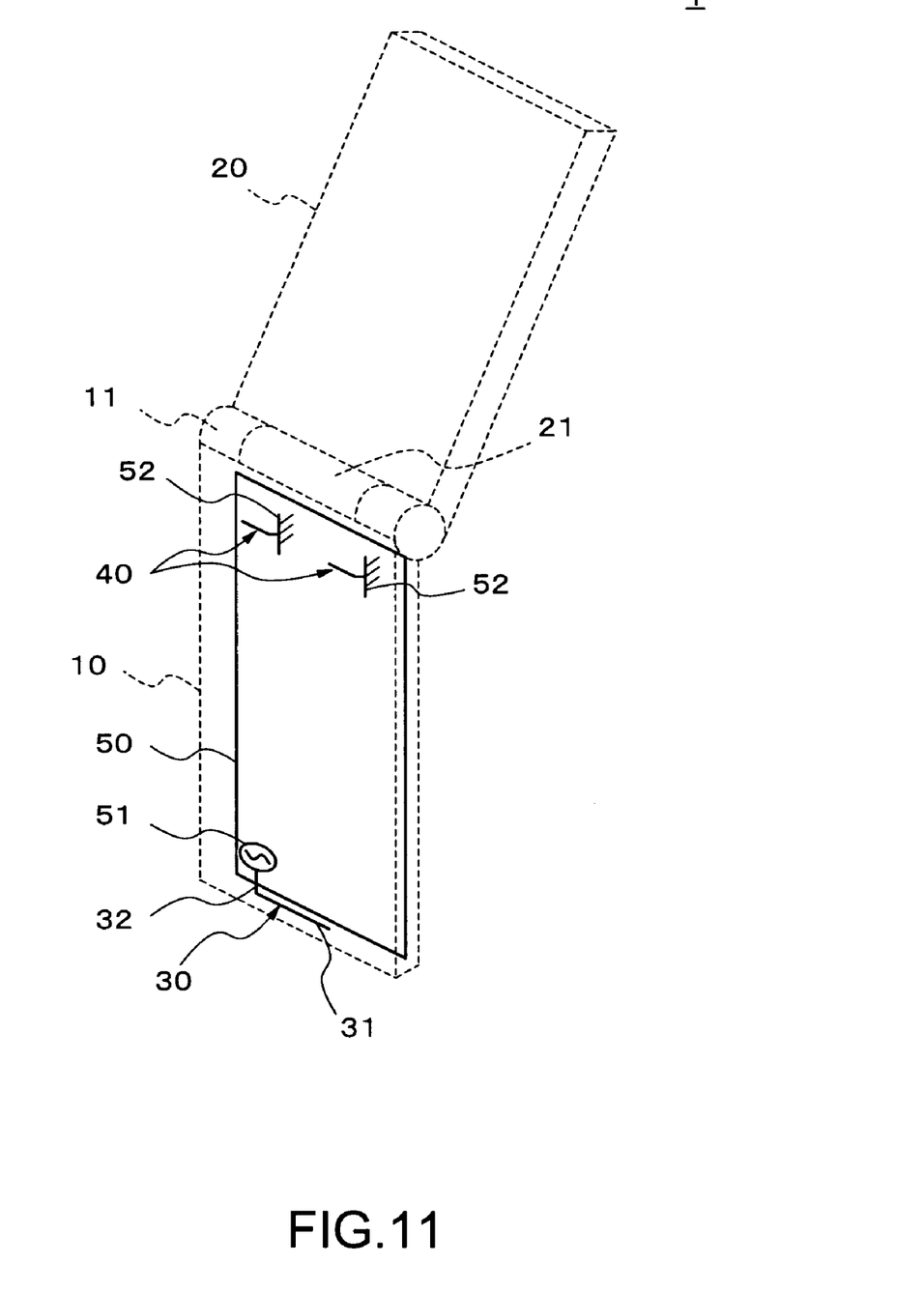
FIG. 11 is a perspective diagram schematically showing a construction of a radio communication device in accordance with a seventh embodiment of the present invention.

Next, the diagrams are used to explain a seventh embodiment of the present invention. FIG. 11 is a perspective diagram schematically showing a construction of a radio communication device in accordance with the seventh embodiment of the present invention. According to the seventh embodiment, multiple antenna improving elements 40 are furnished. Furnishing multiple antenna improving elements 40 is more effective than furnishing one antenna improving element 40 for reducing the radio frequency current 60 flowing to the second case 20. The specific resonance frequency of multiple antenna improving elements 40 become the frequency of the antenna apparatus 30 due to precise adjustments, thereby achieving an even greater effect.

Eighth Embodiment

Figure 12:
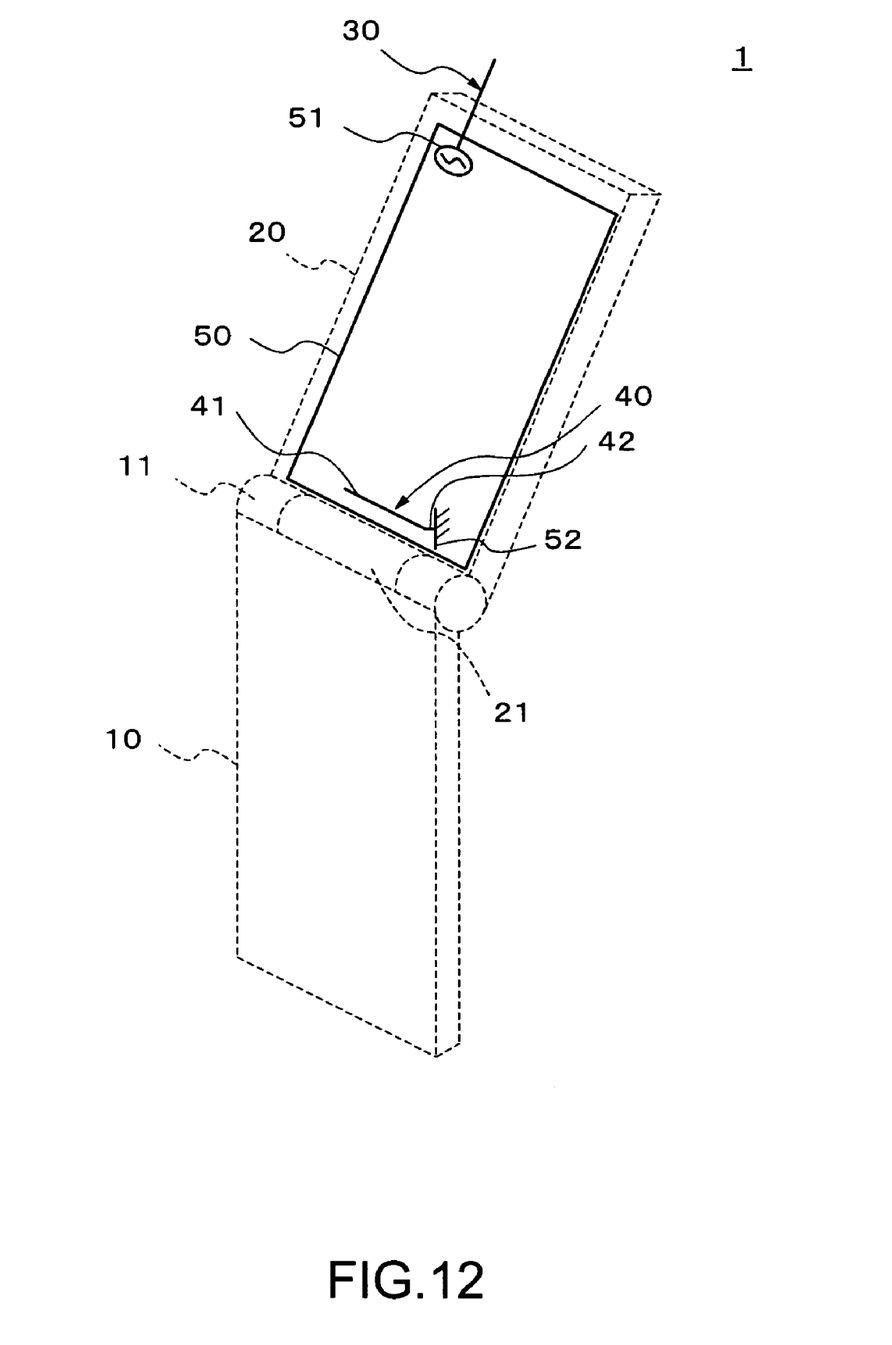
FIG. 12 is a perspective diagram schematically showing a construction of a radio communication device in accordance with an eighth embodiment of the present invention.

Next, the diagrams are used to explain an eighth embodiment of the present invention. FIG. 12 is a perspective diagram schematically showing a construction of a radio communication device in accordance with the eighth embodiment of the present invention. According to the eighth embodiment, the antenna apparatus 30 is furnished to the outside of the second case 20, in a fixed state. The antenna improving element 40 is furnished inside the second case 20, near the connecting member 21. The eighth embodiment can produce an effect similar to the first embodiment.

The first to eighth embodiments described so far are meant just to be examples of preferred embodiments of the present invention, and numerous other modifications and variations can be devised without departing from the scope of the invention. For example, the present invention may be applied to a radio communication device having a case that cannot be folded.

What is claimed is:

1. A radio communication device, comprising:
   a case;
   a circuit board mounted inside the case;
   an antenna apparatus that is fed electricity from the circuit board; and
   one or a plurality of antenna improving elements that are each arranged inside the case and each have a line section with one end grounded at one point to a ground of the circuit board and with another end open, wherein:
   the antenna improving element resonates at a same frequency as said antenna apparatus;
   the antenna improving element is arranged near a central portion of the case along a longitudinal direction thereof; and
   the antenna apparatus is arranged near an end of the case along the longitudinal direction thereof.
   wherein the antenna improving element is bent to fit inside the case along a shape of an inner surface thereof.

2. The radio communication device according to claim 1, wherein:
   the case includes a first case and a second case;
   the first case and the second case are connected to each other in a foldable fashion via a connecting member;
   the circuit board is mounted inside the first case;
   the one or a plurality of antenna improving elements are arranged inside the first case near the connecting member; and
   the antenna apparatus is arranged inside the first case in a position more distant from the connecting member than the antenna improving element.

3. The radio communication device according to claim 2, wherein the antenna improving element prevents electric current from flowing from the first case to the second case.

4. The radio communication device according to claim 1, wherein;
   the case includes a first case and a second case;
   the first case and the second case are connected to each other in a foldable fashion via a connecting member;
   the circuit board is mounted inside the second case;
   the one or plurality of antenna improving elements are arranged inside the second case near the connecting member; and
   the antenna apparatus is arranged on an outside of the second case in a position more distant from the connecting member than the antenna improving element.

5. The radio communication device according to claim 1, wherein the line section is made of a conducting plate.

6. The radio communication device according to claim 1, wherein the line section is made of one of a conducting plate and a conducting wire formed in a meander shape.

7. The radio communication device according to claim 1, wherein the line section is made of a conducting wire formed in a coil shape.

8. The radio communication device according to claim 1, wherein the line section is formed as an integral molding with dielectrics.

9. The radio communication device according to claim 1, wherein the antenna improving element serves as a reflector which replaces a ground.

10. The radio communication device according to claim 1, wherein the antenna apparatus is arranged inside the case.

11. A radio communication device, comprising:
- a first case;
- a second case connected to the first case in a foldable fashion via connecting means;
- a circuit board mounted inside the first case;
- an antenna apparatus that is arranged inside the first case and is fed electricity from the circuit board;
- one or a plurality of antenna improving means that are each arranged inside the first case and each have one end grounded at one point to a ground of the circuit board and with another end is open, wherein:
    - the antenna improving means resonates at a same frequency as said antenna apparatus;
    - the antenna improving means is arranged near the connecting means; and
    - the antenna apparatus is arranged in a position more distant from the connecting means than the antenna improving means,
- wherein the antenna improving element is bent to fit inside the first case along a shape of an inner surface thereof.

12. The radio communication device according to claim 11, wherein the antenna improving element serves as a reflector which replaces a ground.

13. The radio communication device according to claim 11, wherein the antenna improving element prevents electric current from flowing from the first case to the second case.

* * * * *